United States Patent [19]
Janakiraman

[11] Patent Number: 6,072,952
[45] Date of Patent: Jun. 6, 2000

[54] METHOD AND APPARATUS FOR COALESCING VARIABLES

[75] Inventor: Bhaskar Janakiraman, Sunnyvale, Calif.

[73] Assignee: Hewlett-Packard Co., Palo Alto, Calif.

[21] Appl. No.: 09/064,933

[22] Filed: Apr. 22, 1998

[51] Int. Cl.[7] .................................................. G06F 9/445
[52] U.S. Cl. ........................................................ 395/709
[58] Field of Search ................................... 395/709, 704, 395/705, 701

[56] References Cited

U.S. PATENT DOCUMENTS

| | | |
|---|---|---|
| 4,571,678 | 2/1986 | Chaitin . |
| 4,890,240 | 12/1989 | Loeb et al. . |
| 5,230,049 | 7/1993 | Chang et al. . |
| 5,355,491 | 10/1994 | Lawlor et al. . |
| 5,530,866 | 6/1996 | Koblenz et al. . |
| 5,560,015 | 9/1996 | Onodera . |
| 5,652,883 | 7/1997 | Adcock . |
| 5,787,284 | 7/1998 | Blainey et al. ........................... 395/701 |
| 5,790,862 | 8/1998 | Tanaka et al. ............................ 395/705 |
| 5,850,549 | 12/1998 | Blainey et al. ........................... 395/705 |
| 5,881,288 | 3/1999 | Sumi et al. ............................... 395/704 |

OTHER PUBLICATIONS

Chow teaches the priority based coloring approach to register allocation in ACM Transactions on Programming Languages and Systems, vol. 12, No. 4. Oct. 1990.

Knobe et al teach Register Allocation Using Control Trees in Technical Report No. CS–92–13, Mar. 1992.

Chaitin teaches Register allocation & Spilling via Graph Coloring, in Sigplan Symposium on compiler construction, Jun. 23–25, 1982.

Agarwal et al teach Interprocedural Partial Redundancy Elimination and Its Application to Distributed Memory Compilation in their paper, 1993.

Cytron et al teach An Efficient Method of Computing Static Single Assignment Form in Technical Report No. CS–88–16, Oct., 1988.

Title: Optimistic register coalescing, author:: Jinpyo Park; Soo–Mook Moon, IEEE, published on Mar. 1998.

Joel Auslander, et al., "Fast, Effective Dynamic Compilation", Department of Computer Science and Engineering, University of Washington, PLDI' 96, pp. 1–11.

Mark Hall, "Reg. Alloc.—Graph Coloring—Copy Minimization", (visited Nov. 20, 1997) <http://cuiwww.unige.ch/OSG/people/jvitek/Compilers/Year90/msg00619.html> pp. 1–3.

Guhan Viswanathan and James R. Larus, "Compiler–Directed Shared–Memory Communication For Iterative Parallel Applications", (visited Nov. 20, 1997) <http://www-.bib.informatick.th–darmstadt.de/sc96/VISWA> pp. 1–18.

(List continued on next page.)

*Primary Examiner*—Tariq R. Hafiz
*Assistant Examiner*—Chameli C. Das

[57] ABSTRACT

A method and apparatus for improving the process of software development by a fast coalescing compiler optimizer tool that operates with one compiler pass. The present invention is a software development tool for optimization that analyzes one or more instructions, and when the instruction is a copy instruction the tool analyzes the source variable and the target variable of the copy instruction for opportunities to coalesce the source variable and the target variable. The present invention tailors its processing to advantageously enable user-level debugging when debugging is required. The present invention coalesces a target variable of a copy instruction and a source variable of the copy instruction; when the target variable of a copy instruction does not interfere with the source variable of the copy instruction, and the only use of the source variable in the program is in the copy instruction, and the source variable has one or more definitions and all the definitions in the program precede the copy instruction and are in a common basic block. The present invention coalesces a source variable of a copy instruction with a target variable of the copy instruction when the target variable has a single definition that is defined in the copy instruction, and the definition of the target variable precedes all uses in the program of the variable, and all uses of the variable are in the same basic block, and the source of the copy instruction and the target of the copy instruction do not interfere.

10 Claims, 8 Drawing Sheets

OTHER PUBLICATIONS

Preston Briggs, "Coalescing Register Allocators", (visited Nov. 20, 1997) <http://cuiwww.unige.ch/OSG/people/jvitek/Compilers/Year93/msg00834.html> pp. 1–2.

V. Sarkar, "Automatic Selection Of High–Order Transformations In The IBM XL FORTAN Compilers", (visited Nov. 20, 1997) <http://www.almaden.ibm.com/journal/rd/413/sarkar.txt> pp. 1–38.

Brian Grant, et al., "Annotation–Directed Run–Time Specialization In C", Department of Computer Science and Engineering, University of Washington, PEPM'97 Proceedings, <http://www.cs.washington.edu/research/dyncomp/> pp. 1–16.

Preston Briggs, "Register Allocation Via Graph Coloring", A Thesis Submitted In Partial Fulfillment Of The Requirements For the Degree, Rice University, Houston, Texas (Apr. 1992), pp. 1–143.

G.J. Chaitin, "The Limits Of Mathematics–Tutorial Version", IBM Research Report, RC 20190 (Sep. 18, 1995) Computer Science/Mathematics, pp. 1–141.

G.J. Chaitin, "An Invitation To Algorithmic Information Theory", (visited Nov. 21, 1997) <http://www.cs.auckland.ac.nz/CDMTCS/chaitin/inv.html> pp. 1–18.

F.E. Allen and J. Cocke, "A Program Data Flow Analysis Procedure", IBM Thomas J. Watson Research Center, Communications of the ACM, vol. 19, No. 3, (Mar. 1976), pp. 137–147.

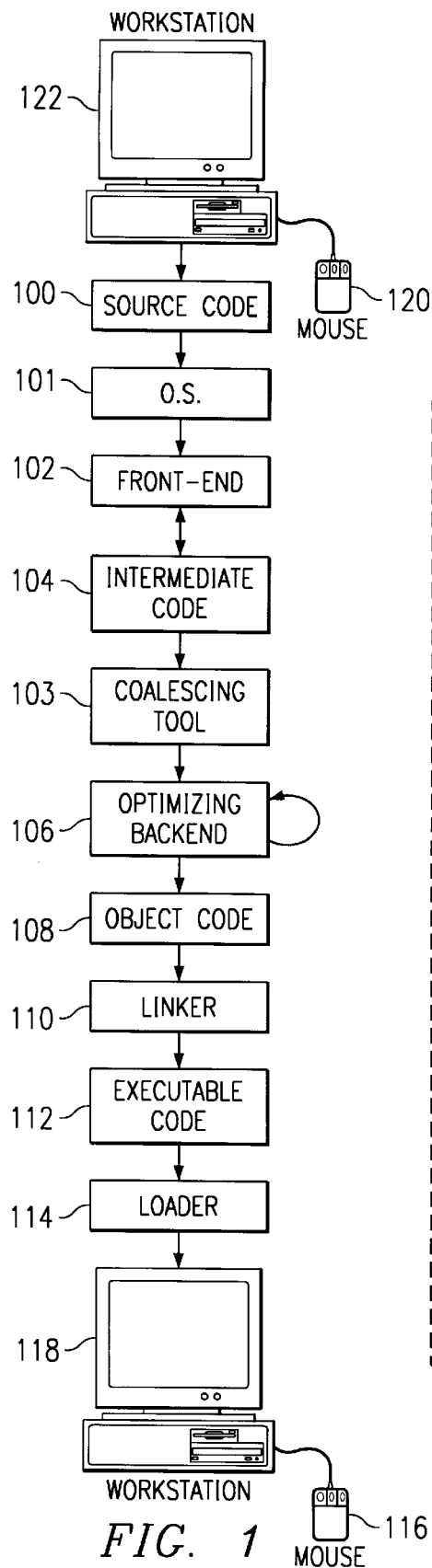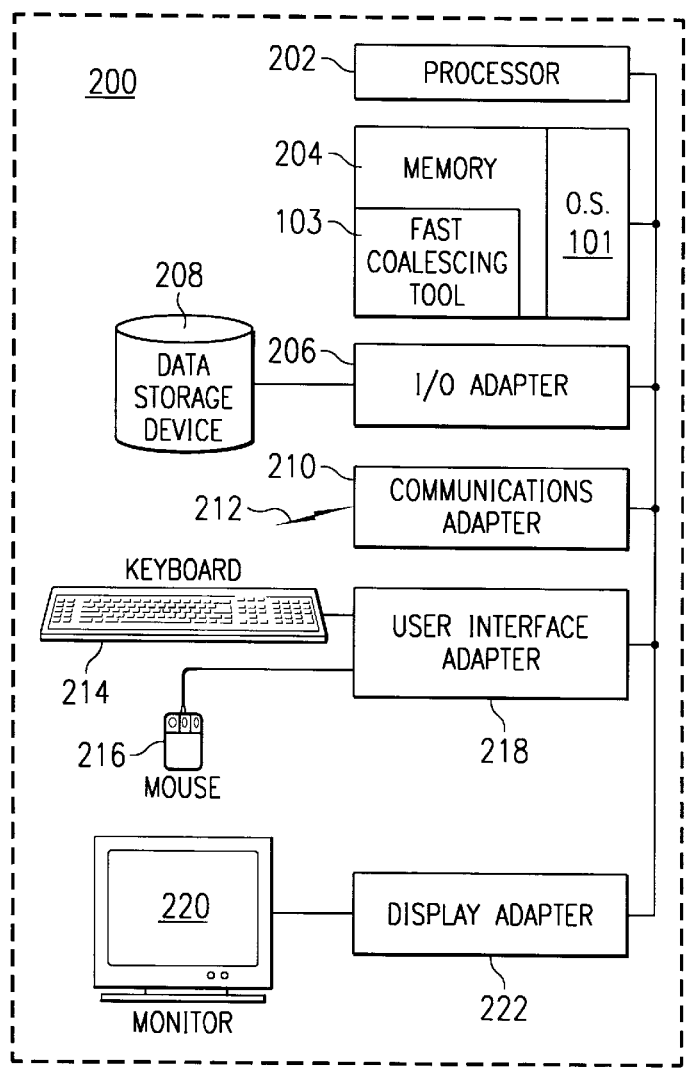
FIG. 1
FIG. 2

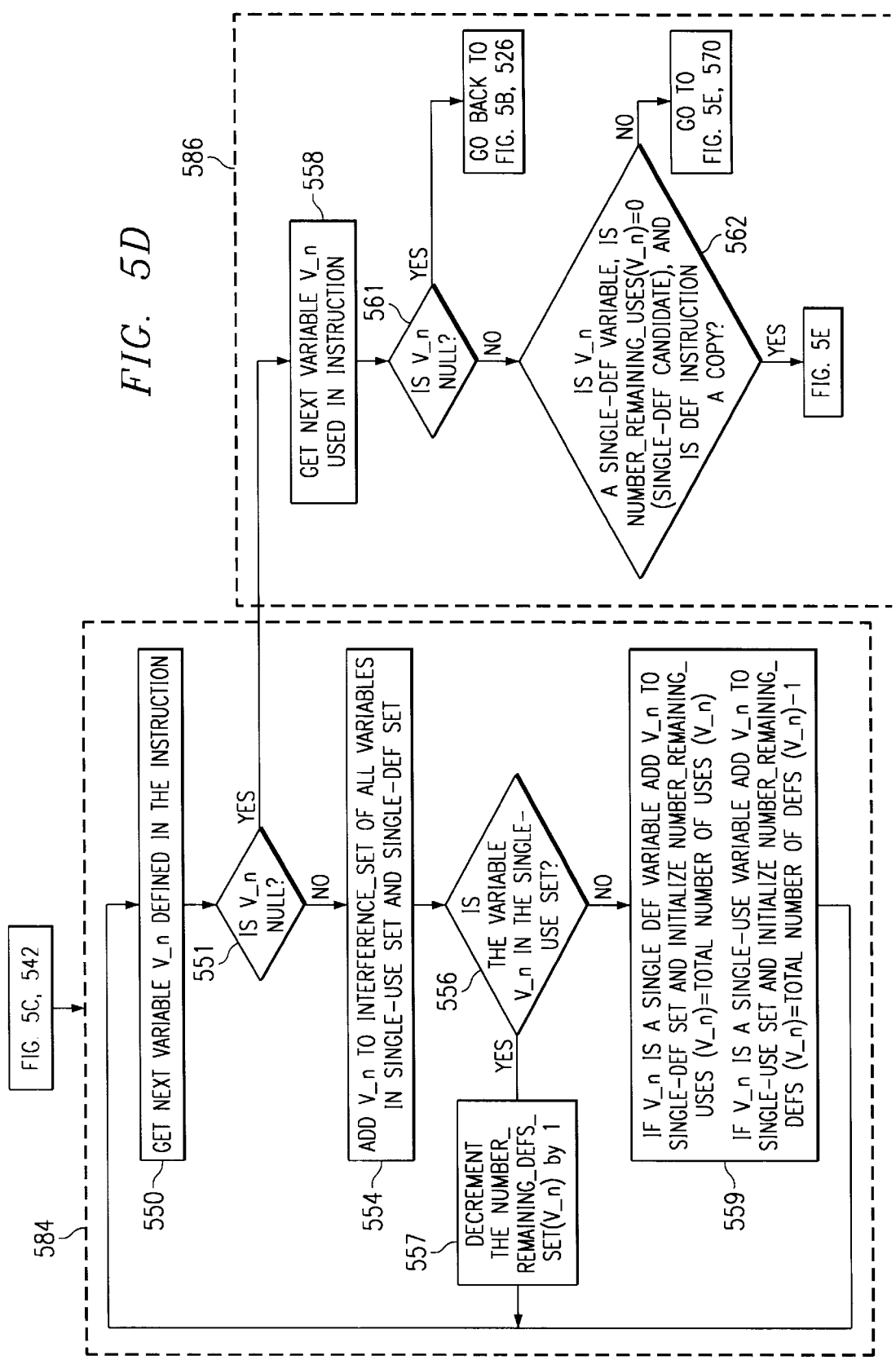

METHOD AND APPARATUS FOR COALESCING VARIABLES

FIELD OF THE INVENTION

The present invention relates to software development tools and is directed more particularly to a low-level compiler optimization tool that aids in the development and maintenance of computer software. The present invention is a fast live range coalescing tool that enables improved register allocation and assignment for optimizing compiler performance and user code performance while enabling full software debugging capabilities.

BACKGROUND OF THE INVENTION

Software developers typically follow a work cycle of development, debugging, and testing of code. The productivity of a software developer can be improved by reducing the time spent in any part of the development cycle. Development and debugging productivity primarily depends on compilation time. Test productivity predominately depends on the efficiency of the executable code. Therefore it is important to continue to create compiler optimization tools that improve compilation and code generation, while producing code which can be fully debugged.

Almost all microprocessors have a load-store architecture in which values are loaded from memory into registers, operations are performed on values loaded in the registers, and the resulting values are again stored into memory. Accordingly, register allocation is an important technique of compiler optimization because the number of computer registers is limited and because register operations are performed faster than memory loads and stores.

There are a number of methods of optimizing register allocation. One method, either via profiling or by means of heuristic analysis, determines the relative benefit to be achieved by reducing the number of memory operations during register allocation. For instance, variables that are included in a nested software loop are prime candidates for optimizing register allocation. Variables used in inner loops are usually better candidates for optimizing register allocation than outer loops since typically more execution time is spent in inner loops than outer loops.

Another method for optimizing register allocation is global optimization via graph coloring. Graph coloring techniques allocate a color for each available computer register and determine whether the same register, represented by a graph color, may be used at different times by more than one value. The graph coloring technique is typically applied to an intermediate representation of the code, and according to the technique if a code instruction uses a value, the value is referred to as live during the time period in which the code instruction is executed. The range of code instructions in which the value is live is referred to as a live range of the value. While a value is live it is desirable to allocate a register to the value to enable instruction processing to continue without storing the value in memory. However, if there are more values requiring register allocation than available hardware registers, some of the values must be temporarily stored in memory and this situation is referred to as spill. The goal of register allocation is to allocate hardware registers to each value in a code segment while reducing or eliminating spill.

The graph coloring technique operates on values which may reside in virtual registers. Virtual registers may represent hardware registers, and it is assumed that there are an unlimited number of virtual registers available. As used herein the phrase computer registers, represents those registers that are visible to the software developer.

Coalescing is a technique that eliminates or reduces spill by exploiting opportunities to merge variables and thereby reduce the number of variables requiring register allocation. For instance, if two variables are required to be in computer registers at the same time, coalescing techniques determine whether the variables actually consist of the same value. If the two variables consist of the same value they need not be located in different computer registers.

Since variables may be merged during coalescing, another problem with past coalescing techniques is that the coalesced variable may not accurately represent the value that was originally associated with the variable, and therefore the software developer may be prevented from getting accurate debugging information about the coalesced variables. Consequently prior art coalesced code is seldom amenable to debugging. Yet, another problem with past coalescing is that fully coalesced variables require multiple iterations of the user code to compute the global data flow and often use techniques such as interference graphs. An interference graph is a pictorial representation of the relationship between the values and the instructions in which the values are used or defined and the interference graph is used to determine whether a variable may share a register with another variable. Iterative analysis cycles such as are typically required with the use of interference graphs employ expensive computer resources.

Prior art global register allocation was defined by John Cocke as described by, F. E. Allen and J. Cocke, *A Program Data Flow Analysis Procedure*, Association for Computing Machinery, Inc., Vol. 19, No. 3, 137–147 (1976). An early implementation was completed by Gregory Chaitin as described in, *Register Allocation and Spilling via Graph Coloring*, U.S. Pat. No. 4,571,678. A typical prior art global register allocation design was developed by Preston Briggs and is discussed in his Ph. D. Thesis from the Department of Computer Science at Rice University, *Register Allocation via Graph Coloring*, at pp. 14–16, 1992.

As known to those skilled in the art, coalescing problems such as retaining large numbers of live ranges and large interference graphs that increase the computer overhead necessary for processing, the inability to use coalesced results with debugging tools, and other related difficulties with coalescing for compilers and dynamic software development tools, such as debugging tools, have resulted in limitations on the further improvement of software development techniques.

SUMMARY OF THE INVENTION

The present invention is a method and apparatus relating to compiler optimization technology that enables fast coalescing of variables by exploiting the potential for merging variables in copy instructions and for eliminating copy instructions. While the prior art depends on global data flow analysis which works over multiple compiler analysis cycles, and may be referred to as compiler passes, the present invention eliminates subsequent passes over the code for the purpose of variable coalescing. The present invention contributes to more efficient, faster compiler optimization passes while preserving information necessary for debugging.

By coalescing small live ranges, the present invention provides a fast and effective way of reducing the number of registers used. By reducing register allocation overhead, the present invention subsequently reduces compile time. Also, by reducing the computer processing required for register allocation, compilation during optimization is faster for users doing incremental debugging of software than with prior art coalescing techniques. By reducing the number of intermediate instructions the present invention further improves many forms of compiler optimization such as data-flow analysis and static single-assignment (SSA) form. Those skilled in the art will appreciate the computer overhead associated with data flow analysis and SSA form.

The present invention recognizes that compiler generated intermediate code contains many temporary variables and many copy instructions and efficiently reduces the number of variables, and reduces the number of copy instructions. It will be appreciated that a copy instruction as used herein refers generally to the act of representing a variable in a computer by another variable and is not limited to the use of the term "copy". Register assignment is the process of determining the register for use by each allocated value, typically represented by a variable. Since computer registers are accessed faster than memory, the resulting executable code is most efficient when operations occur exclusively between the registers and access to values in computer memory is eliminated or minimized. The present invention improves the speed of subsequent compilation passes, including register allocation, by reducing the number of variables to be processed.

As is known to those skilled in the art, a variable is "defined" when it is assigned a value and it is "used" when it is accessed without changing the value. An instruction may have one or more target variables and one or more source variables, and the target variable of the instruction is typically associated with a defined variable and the source variable is typically associated with a used variable.

The present invention employs coalescing techniques in a novel, efficient way by removing unnecessary copies introduced during compilation. The present invention advantageously optimizes code by recognizing when two variables in a copy instruction are candidates for coalescing and when the copy instruction may be deleted. The present invention further recognizes that multiple uses or multiple definitions of a variable do not automatically preclude the application of fast coalescing techniques to the variable. For instance, the present invention recognizes that the copy instruction may be eliminated and the source variable and the target variable of the copy instruction may be coalesced, if the target variable of the copy instruction does not interfere with the source variable when the only use of the source variable is in the copy instruction (single-use); and the source variable has one or more definitions in a software program and all the definitions precede the copy instruction and are within the same basic block. Similarly, the present invention advantageously recognizes that when a target variable has a single definition (single-def) that is a copy instruction; and the definition of the target variable precedes all uses of the variable in the program, and all uses of the variable are in the same basic block; the copy instruction can be eliminated if the source variable of the copy instruction does not interfere with the target variable of the copy instruction.

The present invention further recognizes that fast coalescing may be advantageously applied when the variables' definitions and uses are within the same basic block of code and thereby efficiently operates in one compiler pass. That is, the present invention is not limited to operating on global information via traditional data-flow analysis.

By operating within one compiler pass, the present invention may advantageously produce coalesced code that preserves the order of the original instructions and the values of the original variables and may thereby enable uninterrupted debugging by maintaining the original relationship between a value and the related variable and by preserving the flow of control of the source code. When debugging is desired the present invention may alter its operation to ensure that copy instructions that cross source line boundaries are not eliminated thereby maintaining the user-created flow of control of the source code. Further the present invention may ensure that variables which may be modified by the software developer and are visible in the user source code, are not coalesced or are coalesced while maintaining the user-visible properties of the variable thereby preserving the accessibility of the variable to the user.

It will be understood by those skilled in the art that the present invention, an optimization tool, may be implemented in software, firmware, hardware, or any combination thereof. Other aspects and advantages of the present invention will become apparent from the following detailed description, taken in conjunction with the accompanying drawings, illustrating by way of example the principles of the present invention.

BRIEF DESCRIPTION OF THE DRAWINGS

FIG. 1 is a block diagram of compiler optimization technology;

FIG. 2 is a block diagram of compiler optimization technology in a computer system;

FIGS. 5B, 5C, 5D, and 5E are detailed flow diagrams of the method of the present invention.

DETAILED DESCRIPTION

Figure 3:
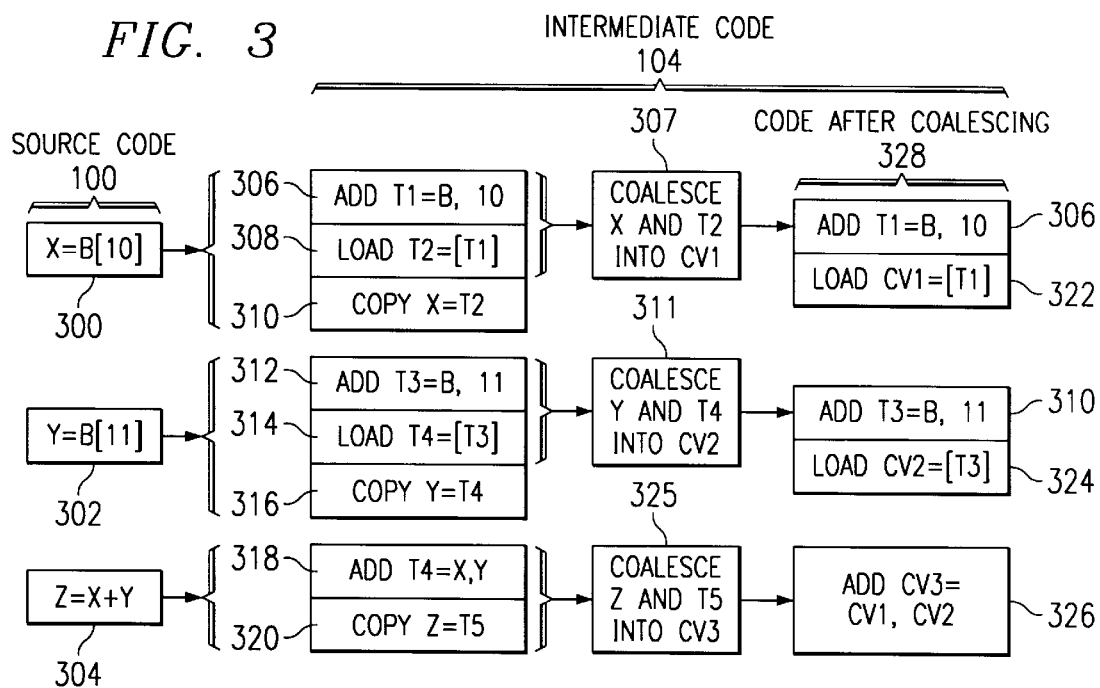
FIG. 3 is a block diagram of the transformation of instructions in a fast coalescing apparatus.

As shown in the drawings for purposes of illustration the present invention is a software development tool that employs computer compiler technology for fast coalescing. The present invention operates in one compiler pass, and recognizes that a large number of copy instructions are created during the compilation process, and are temporary instructions which may be deleted by fast coalescing. The present invention advantageously reduces the number of live ranges by eliminating the variables that define the live ranges, and by recognizing when two variables represent the same value and can therefore be combined. By reducing the number of live ranges, the present invention reduces the number of intermediate instructions, thereby improving efficiency for many optimizer techniques such as data flow analysis and static single-assignment (SSA) form.

In the following detailed description and in the several figures of the drawings, like elements are identified with like reference numerals.

As shown in FIG. 1 the present invention is a form of compiler technology that may use software source code 100 that is generated from an input computer. Preferably, the input computer is a workstation computer 122 with input/output (I/O) devices including a keyboard and a mouse 120.

It will be appreciated that the present invention operates on any multi-purpose computer and is not limited to the illustration herein. A software developer may create source code 100 typically in a high-level programming language such as C. The computer system may manage the processing of the source code 100 through a computer operating system (O.S.) 101 that may direct the source code 100 to be processed by a compiler front-end 102. The compiler front-end 102 may generate intermediate code 104 from the source code 100 and may operate on high-level intermediate code 104. The front-end 102 may optimize code while preserving the structure and sequence of source operations. For instance, the front-end 102 may optimize array contents while retaining the array accesses in the source code 100.

Optimization techniques such as this are utilized by the present invention and illustrated in FIG. 1 may generate intermediate code 104 that is processed by an optimizing back-end 106. The intermediate code 104 is a list of intermediate-level language instructions and the present invention, a fast coalescing tool 103 operates on the intermediate code 104. After the fast coalescing tool 103 has operated on the intermediate code 104, the fast coalescing tool 103 delivers processed code to the optimizing back end 106. If the code semantics can be preserved, the optimizing back-end 106 may move instructions to locations where they are performed less frequently, thereby isolating frequently used instructions for further optimization. The optimizing back-end 106 may generate object code 108 that includes optimization changes which may be dependent on the particular multi-purpose computer on which the compiler optimizer technology operates. These machine-specific changes may allow the optimizing back-end to generate code that is highly tailored to optimally run on a specific multi-purpose computer; for example code may be tailored to support different cache organizations or a different number of computer processors. Further, the optimizing back-end 106 may execute the intermediate code 104 more than once and thereby may make iterative changes in the intermediate code 104 to enhance further processing by the optimizing back-end 106. In the present invention the linker 110 may operate on the output of the back-end 106 which may be object code 108. In order to execute the object code 108 it must be combined with one or more object code modules to create combined user process executable code 112 by a process known as linking. The present invention employs a linker 110 to resolve any undefined computer location references in the object code 108 and to generate executable code 112 capable of executing on an output multi-purpose computer 118 with I/O devices such as a keyboard and a mouse 116. It will be appreciated that the input computer 122 and the output computer 118 may be the same computer and are not limited to the configuration illustrated.

The executable code 112 is formatted to enable a loader 114 to load the executable code 112 into the computer for instruction execution. The executable code 112 may be any of a variety of known executable files or an executable file of a type to be developed in the future. Examples of such known files are those having an extension of ".exe" operating under a DOS or Windows operating system or an "a.out" file of, for instance, a UNIX® operating system.

FIG. 2 is a block diagram of the hardware and software modules that interoperate in a computer system 200 that executes the fast coalescing tool. The computer system 200 includes components such as a processor 202, a memory 204, a data storage device 208, an I/O adapter 206, a communications adapter 210 and a communications network 212, a user interface adapter 218, a keyboard 214, a mouse 216, a display adapter 222, and a computer monitor 220. It will be understood by those skilled in the relevant art that there are many possible configurations of the components of the computer system 200 and that some components that may typically be included in the computer system 200 are not shown.

It will be understood by those skilled in the relevant art that the functions ascribed to the fast coalescing tool 103, or any of its functional modules, typically are performed by the central processing unit that is embodied in the present invention as the processor 202 executing such software instructions, typically in cooperation with other modules in the computer system 200 such as the O.S. 101. Henceforth, the fact of such cooperation among the processor 202, the O.S. 101 and the modules of the invention, whether implemented in software, hardware, firmware, or any combination thereof, may therefore not be repeated or further described, but will be understood to be implied. In particular, the cooperative functions of the O.S. 101, which are well known to those skilled in the relevant art, may be omitted for clarity.

It will also be understood by those skilled in the relevant art that the functions ascribed to the fast coalescing tool 103 and its functional modules, whether implemented in software, hardware, firmware, or any combination thereof, may in some embodiments be included in the functions of the O.S. 101. That is, for example, O.S. 101 may include modules of the fast coalescing tool 103. In such embodiments, the functions of the fast coalescing tool 103 may be described with reference to the execution by the processor 202 but without reference to cooperation with a separate O.S. 101. In such embodiments, the functions ascribed to the fast coalescing tool 103, or any of its functional modules, typically are performed by the processor 202 executing such software instructions in cooperation with aspects of O.S. 101. Therefore, in such embodiments, cooperation by the fast coalescing tool 103 with aspects of an O.S. 101 will not be stated, but will be understood to be implied.

Processor 202 may be a commercially available processor such as a PA-RISC processor made by Hewlett-Packard Company, or it may be one of other processors that are or will become available. Processor 202 executes the O.S. 101, which may be, for example, one of the DOS, Windows 3.1, Windows for Work Groups, Windows 95, or Windows NT operating systems from the Microsoft Corporation; or a UNIX® operating system available from many vendors such as Hewlett-Packard; another or a future operating system; or some combination thereof. In one aspect of the illustrated embodiment, O.S. 101 is the HP-UX version of the UNIX® O.S. made by Hewlett-Packard Company. Operating system 101 interfaces with firmware and hardware in a well-known manner, and facilitates processor 202 in coordinating and executing the functions of the other components of the computer system 200.

Memory 204 may be any of a variety of known memory storage devices or future memory devices, including, for example, any commonly available random access memory (RAM), cache memory, magnetic medium such as a resident hard disk, or other memory storage device. In the one embodiment of the present invention, the O.S. 101 and the fast coalescing tool 103 reside in the memory 204 during execution.

The data storage device 208 may be any of a variety of known or future devices, including a compact disk drive, a tape drive, a removable hard disk drive, or a diskette drive. Any such program storage device may communicate with the I/O adapter 206, that in turn communicates with other components in the computer system 200, to retrieve and store data used by the computer system 200. As will be appreciated, such program storage devices typically include a computer usable storage medium having stored therein a computer software program and data.

Input devices could include any of a variety of known input-output (I/O) devices for accepting information from a user, whether a human or a machine, whether local or remote. Such devices include, for example a keyboard 214, mouse 216, touch-screen display, touch pad, microphone with a voice recognition device, network card, or modem. The input devices may communicate with a user interface I/O adapter 206 that in turn communicates with components in the computer system 200 to process I/O commands. Output devices could include any of a variety of known I/O devices for presenting information to a user, whether a human or a machine, whether local or remote. Such devices include, for example, a video monitor 220, printer, audio speaker with a voice synthesis device, network card, or modem. Output devices such as the monitor 220 may communicate with the components in computer system 200 through the display adapter 222. Input-output devices could also include any of a variety of known data storage devices 208 including a compact disk drive, a tape drive, a removable hard disk drive, or a diskette drive.

By way of illustration, the executable code 112 (as shown in FIG. 1) may typically be loaded through an input device and may be stored on the data storage device 208. A copy of the executable code 112 or portions of it, (hereafter, simply referred to as executable code 112) may alternatively be placed by the processor 202 into the memory 204 for faster execution. In the illustrated embodiment, it will be assumed for clarity that the O.S. 101 causes the processor 202 to place the instructions and data of the executable code 112, constituting what is referred to herein as the user code instructions, or instructions, in the memory 202 for execution.

The computer system 200 may communicate with a network 212 through a communications adapter 210. The network may be a local area network, a wide area network, or another known computer network or future computer network. It will be appreciated that the input-output device used by the fast coalescing tool 103 may be connected to the network 212 through the communications adapter 210 that may not be co-located with the computer system 200. It will be further appreciated that other portions of the computer system, such as the data storage device 208 and the monitor 220, may be connected to the network 212 through the communications adapter 210 and may not be co-located.

The fast coalescing tool 103 may be implemented in the "C" programming language, although it will be understood by those skilled in the relevant art that many other programming languages could also be used. Also, the fast coalescing tool 103 may be implemented in any combination of software, hardware, or firmware. If implemented in software, the fast coalescing tool 103 may be loaded into the memory 204 through one of the input-output devices. Preferably, all or portions of the fast coalescing tool 103 may also reside in a read-only memory or similar device of memory 204, that do not require that the fast coalescing tool 103 to be loaded through the input-output devices. It will be understood by those skilled in the relevant art that the fast coalescing tool 103, or portions of it, may typically be loaded by the processor 202 in a known manner into the memory 204 for execution.

In this detailed description, references are made to various functional modules of the present invention that may be implemented either in software, hardware, firmware, or any combination thereof. For convenience of illustration, references generally are made to implementations in software. Such references therefore typically refer to software-implemented functional modules that will be understood to comprise sets of software instructions that cause described functions to be performed.

In one configuration, the present invention is directed to a computer program product comprising a computer usable medium having control logic such as a computer software program including program code, stored therein. The control logic, when executed by the processor, causes the processor to perform the functions of the invention as described herein. In another embodiment, the present invention is implemented primarily in hardware using, for example, a hardware state machine. Implementation of the hardware state machine so as to perform the functions described herein will be apparent to those skilled in the relevant art.

One embodiment of the present invention may advantageously exploit information that may be available from existing operating systems (O.S.). For instance, the UNIX® O.S. compiler system may manage a table containing a reference set and information residing therein may be accessible via the compiler system. More particularly, the present invention may access from the reference set information about the variables, such as the definitions and the uses of a particular variable. The reference set may include a counter that logs the number of definitions and uses of the variables in the program, and a log of each instruction associated with a particular definition or use of the variable. The reference set table may be updated by the compiler system as instructions are modified, deleted, or added. It will be appreciated that the present invention is not limited to computer systems that provide the reference set. The present invention may operate without the reference set by obtaining the necessary information from other compiler system mechanisms well known to those skilled in the art.

As is known to those skilled in the art, a variable is "defined" when it is assigned a value. By defining a variable, a relationship is established between a variable and a value. A variable is "used" when it is accessed and the value assigned to the variable is not changed. A target variable is typically associated with a defined variable and a source variable is typically associated with a used variable. The present invention novelly employs a fast coalescing technique that depends on the ability to identify variables that have a single use or that have a single definition. The present invention accesses information about variables and the values they represent including whether a variable is used, is defined, is a target variable, is a source variable, is a member of the single definition set, is a member of the single use set, or is a member of one or more interference sets; and the present invention may store this information.

An interference set is a log of all the variables that interfere with the variable and may be updated as the instructions are processed. An interference graph is a representation of the relationship between the variables and the instructions in which they are used or defined and the interference graph is used to determine whether a variable may share a register with another variable. That is, if another variable interferes with the variable the two variables may not share a register due to their overlapping use. The present invention novelly implements a fast coalescing technique without use of an interference graph.

If two values are required to be in computer registers at the same time, the present invention determines whether they must be located in different computer registers. Therefore, it is important to ascertain when a value will be used. If a code instruction uses the value, the value is referred to as live. The range of code instructions in which the value is live is referred to as a live range of the value. If the live ranges of two values have any common instructions, the two values cannot occupy the same hardware registers and the values must be allocated to different hardware registers, and two live ranges are said to interfere.

In one configuration, the present invention operates on basic code blocks, and traverses one instruction at a time. If the first instruction in the basic block is executed, all other instructions in the basic block will be executed. A basic block may also consist of a single instruction. A basic block has a single entry instruction and a single exit instruction that is defined by a branch instruction.

More particularly, Table 1 below illustrates a Live Range wherein instruction 1, "x=100", and instruction 2, "y=20", are assigned to hardware registers. Since "x" and "y" are both used in instruction 3, "z=x−y", "x" and "y" share a common instruction and therefore are live during the code range. If "x" and "y" are assigned the same hardware register, since "y" will be assigned the register subsequent to "x", the value in "x" will be lost. Therefore "x" will incorrectly be attributed the value in "y" which is 20. Since instruction 3 uses both "x" and "y", if "x" and "y" are incorrectly assigned the same hardware register the value of "z=20−20=0" is incorrectly calculated instead of the correct value "z=100−20=80". By way of comparison, instruction 4, "x=200", illustrates the start of a new live range since "x" is assigned a new value.

TABLE 1

| Live Range | |
|---|---|
| instr 1: x = 100; | current live range of x |
| instr 2: y = 20; | current live range of x |
| instr 3: z = x − y | current live range of x |
| instr 4: x = 200; | new live range of x begins |

Coalescing

Coalescing, a technique that merges variables, is useful for simplifying steps in the compilation process such as enabling machine instructions requiring source and target registers to have their operands and results in the proper registers; enabling two-address instructions to have their target register and the operand that must be in that register handled as required; and ensuring that instructions that require a register pair for some operand or result are assigned as a pair. Coalescing is a method of optimization that merges live ranges of non-interfering variables and thereby reduces the number of live ranges, the number of copy instructions, and the size of the interference graph. Copy instructions are often created for temporary use by the compiler and are amenable to coalescing techniques.

Traditionally coalescing methods depend on global register allocation, data-flow analysis, and interference graph construction and require significant computer resources to execute. By contrast, the present invention advantageously operates in one compiler pass and exploits the use of temporary variables in copy instructions by applying fast coalescing techniques. Some of the factors considered in the analysis of whether register allocation is appropriate are load instruction and store instruction costs; register-to-register move instruction costs; and the savings often realized by loading a particular value into a register when it is repeated, due to the effect of loop iteration.

The graph coloring approach may be used in global register allocation. The graph coloring technique represents each live range by a node in the graph, and interference between two live ranges is represented by an arc in the graph. The graph coloring technique allocates a color for each live range, and allocates adjacent nodes a color that is distinct from the color of the other adjacent nodes. The goal of the graph coloring technique is to reduce or eliminate spill. According to the graph coloring technique, there are a finite number of hardware registers and the finite number may be referred to as "R". The nodes in the live range are each allocated a color and the number of colors is limited to R. After the nodes are assigned a color, each node may be assigned the register that corresponds to its R-color and any nodes which remain after all the R-color registers have been assigned are spilled into memory registers, herein referred to as virtual or symbolic registers. The complexity of register allocation lies in the method of reducing the amount of spill and managing the spill that occurs.

Traditionally, the use of live range register coalescing techniques determines if the live ranges corresponding to the source of the copy instruction and the target of the copy instruction interfere by having any common instructions. If there is no interference the live ranges of the variables in the copy instruction are combined; and the interference graph is updated by combining, or coalescing, the nodes corresponding to the variables. After the variables are combined, all references to the variables are replaced by references to the coalesced variable, and the copy instruction is removed. Another coalescing cycle may be initiated if any copy instructions were removed in the current coalescing cycle.

Global register allocation and graph coloring are forms of computer system compiler technology. For a general discussion of existing compiler and emulation tool technology, see *Principles of Compiler Design*, by Alfred V. Aho and Jeffrey D. Ullman (Addison-Wesley, 1977), which is herein incorporated by reference in its entirety. For an advanced discussion of existing compiler and emulation tool technology, see *Advanced Compiler Design and Implementation*, by Steven S. Muchnick (Morgan Kaufmann Publishers, 1997), which is herein incorporated by reference in its entirety.

The present invention advantageously determines whether there is a single-use variable or a single-def variable in a copy instruction. A single definition is the case where a variable is defined only once in the entire program and a single use occurs when a variable is used only once in the entire program. For instance, the definition of the variable "y" is created by "copy y←x" and in this example "x" is used. A single definition of "y" would exist if there is no other definition of "y" and a single use of "x" would exist if there is no other use of "x" in the program.

The present invention novelly recognizes that fast coalescing may be performed on single-use and single-def variables in copy instructions. The present invention recognizes when two variables in a copy instruction are candidates for coalescing and when the copy instruction may be deleted. Multiple uses of a single-def variable and multiple definitions of a single-use variable may not necessarily preclude the variable from fast coalescing processing. For example, the present invention recognizes that the copy instruction may be eliminated and the source variable and the target variable of the copy instruction may be coalesced, if the target variable of the copy instruction does not interfere with the source variable when the only use of the source variable is in the copy instruction (single-use); and the source variable has one or more definitions in the program and all the definitions precede the copy instruction and are within the same basic block. Similarly, the present invention advantageously recognizes that when a target variable has a single definition (single-def) that is a copy instruction; and the definition of the target variable precedes all uses of the variable in the program, and all uses of the variable are in the same basic block; the copy instruction can be eliminated if the source variable of the copy instruction does not interfere with the target variable of the copy instruction.

According to the present invention and by way of illustration, in Table 2 below which illustrates Coalescing During a Single Definition of "y", the following live range code block is an example of two variables that may be coalesced and of a copy instruction that may be deleted. When "y" is defined by the "copy y←x" instruction; and the value of "x" is not defined or used before the last use of "y"; and there is no new definition of "y" prior to the last use of "y" in the instruction "z=y"; then "y" and "x" can be merged. Also, "y" and "x" can be merged even when there are multiple uses of "y" if there is a single definition of "y".

TABLE 2

Coalescing During a Single Definition of "y"

| | |
|---|---|
| copy y ← x | definition of "y" |
| | "x" is not used or defined throughout |
| m = y + 5 | earlier use of "y" |
| . | |
| z = y | last use of "y" |

Similarly, according to the present invention Table 3 below illustrates Coalescing During a Single Use of "y" whereby two variables can be coalesced when the single use of one variable is a copy instruction. When "y" has been defined a number of times and is used once, in a copy instruction; and "z" is not used or defined until the single use of "y"; the copy instruction can be eliminated, and "z" and "y" can be merged. It will be appreciated that in computer architectures that support conditional instruction execution, multiple definitions of a variable may be based on a tested condition and one or more definitions of the variable may be executed. The conditional quality of such an instruction sequence will not impair the basic block boundary.

TABLE 3

Coalescing During a Single Use of "y"

| | |
|---|---|
| y = 100 | |
| y = x + z | last definition of "y" which has been previously defined |
| . | "z" is not used or defined throughout |
| . | |
| copy z ← y | "y" is used in a copy instruction |

By way of comparison in Table 4 below, which illustrates Coalescing Not Possible, "z" is used in "y's" live range and therefore "y" and "z" cannot be merged.

TABLE 4

Coalescing Not Possible

| | |
|---|---|
| y = 100 | |
| y = x + z | last definition of "y" which has been previously defined |
| . | |
| q = z | "z" is used in "y's" live range |
| . | |
| copy z ← y | "y" is used in a copy instruction |

The present invention novelly determines whether two variables may be coalesced by recognizing that intermediate code may include many temporary copy instructions. That is, intermediate code may contain copy instructions that are generated by the front end 102 (as shown in FIG. 1) for limited purposes and the copy instructions may therefore have variables that may be coalesced. As shown in FIG. 3 the present invention may operate on source code 100 instructions such as those shown in instructions 300, 302, and 304. For purposes of illustration the instructions 300, 302, and 304 have been transformed into intermediate code 104 that contains copy instructions. For example, instruction 300 is an instruction that defines "X" and is translated into intermediate code instructions 306, 308, and 310. Instruction 310 is a copy instruction that is a candidate for fast coalescing. Similarly, instruction 302 is an instruction that defines "Y" and that translates into instructions 312, 314, and 316. Instruction 304 is a copy instruction that uses "X" and "Y" and that defines "Z", similarly translates into instructions 318 and 320. Copy instruction 320 is a candidate for fast coalescing.

As further shown in FIG. 3 in step 328 the present invention generates code after coalescing. For example, the copy instruction 310 is coalesced by deleting the copy instruction 310 and merging x and T2 into a variable CV1, in step 307. Additionally, the load instruction 308 is transformed into the load instruction 322 after coalescing and the add instruction 306 is unchanged. The add instruction 306 is unchanged after coalescing.

Similarly, the add instruction 312 is unchanged after coalescing while the copy instruction 316 is coalesced by deleting the copy instruction 316 and, in step 311, coalescing Y and T4 into a variable CV2. Also, the load instruction 314 is transformed into the load instruction 324.

In another example, coalescing of the copy instruction 320, requires deleting the copy instruction 320 and coalescing Z and T5 in step 325. Additionally, the add instruction 318 is transformed into the add instruction 326. Since X, Y, and T4 have all been coalesced, the add instruction 326 reflects the coalescing of T4, X, and Y.

Figure 4:
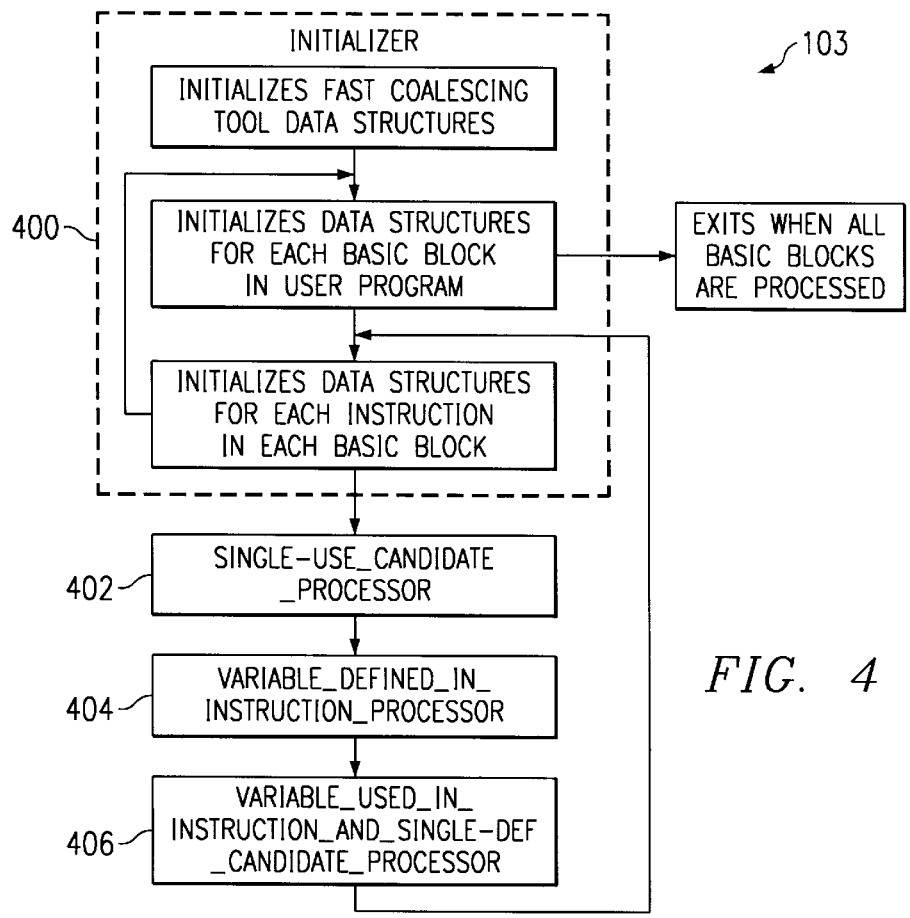
FIG. 4 is a block diagram of a compiler optimizer.

As shown in FIG. 4, the fast coalescing tool 103 includes an initializer 400 that establishes the values of data structures of the fast coalescing tool 103. According to the present invention, the initializer 400 assigns an interference set to be empty for all user code variables. The initializer 400 also assigns a single-def set to be empty. The initializer 400 further assigns a single-use set to be empty. The single-use set is a data structure of the fast coalescing tool 103 that maintains a set of all the variables with a single use. The single-def set is a data structure of the fast coalescing tool 103 that maintains a set of all the variables with a single definition.

Further, the initializer 400 may establish the data structures employed by the fast coalescing tool 103 during the processing of a basic block. In one embodiment of the present invention, the initializer 400 may define a "number_ remaining_defs (V_n)" variable that maintains a running count of the number of definitions of the variable which may be seen as "remaining instructions are further processed. The initializer 400 may also define a number_remaining_uses (V_n)" variable that maintains a running count of the number of uses of the variable which may be seen as remaining instructions are further processed.

Further, for each instruction within the basic block, the initializer 400 identifies a source and target variable if the instruction is a copy instruction. It will be understood that variables may be represented in computer systems as data structures. When the initializer 400 determines that all the instructions of a basic block have been processed, it initiates processing on another basic block. When the initializer 400 determines that all basic blocks have been processed the initializer 400 exits the user program by passing processing control back to the computer system 200 (as shown in FIG. 2).

When the initializer 400 has completed initialization of the instruction, the initializer 400 passes processing control of the instruction to the single-use_candidate processor 402. A single-use candidate variable is a variable in which all of the definitions of the variable in the program have been encountered in the basic block prior to the single use of the variable, and therefore the number_remaining_defs variable corresponding to the single-use candidate variable equals zero. According to the present invention, the candidate single-use variable of the instruction is processed to determine whether the single-use variable may be coalesced with the target of the instruction.

After the single-use_candidate processor 402 has completed processing the instruction, processing control is passed to the variable_defined_in_instruction processor 404. According to one embodiment of the present invention, the variable_defined_in_instruction processor 404 may update the interference set of all the variables in the instruction if the variables interfere with the variables in a single-use set or the single-def set. The variable_defined_in_instruction processor 404 may further update the bookkeeping values of the number_remaining_defs variable and the number_remaining_uses variable of the processed variables of the instruction.

After the variable_defined_in_instruction processor 404 has completed execution, processing control is passed on to the "variable_used_in_instruction_and_single-def_candidate processor" 406. A single-def candidate variable is a variable with only one definition in the user program and all the uses of the single-def candidate variable in the program occur, after the defining instruction containing the single-def candidate variable and in the basic block of the defining instruction, therefore making the number_remaining_uses variable corresponding to the single-def candidate variable equal to zero. If the single-def defining instruction is a copy instruction according to the present invention, the single-def candidate variable may be coalesced with the source of the copy instruction that defined the single-def candidate variable.

Figure 5:
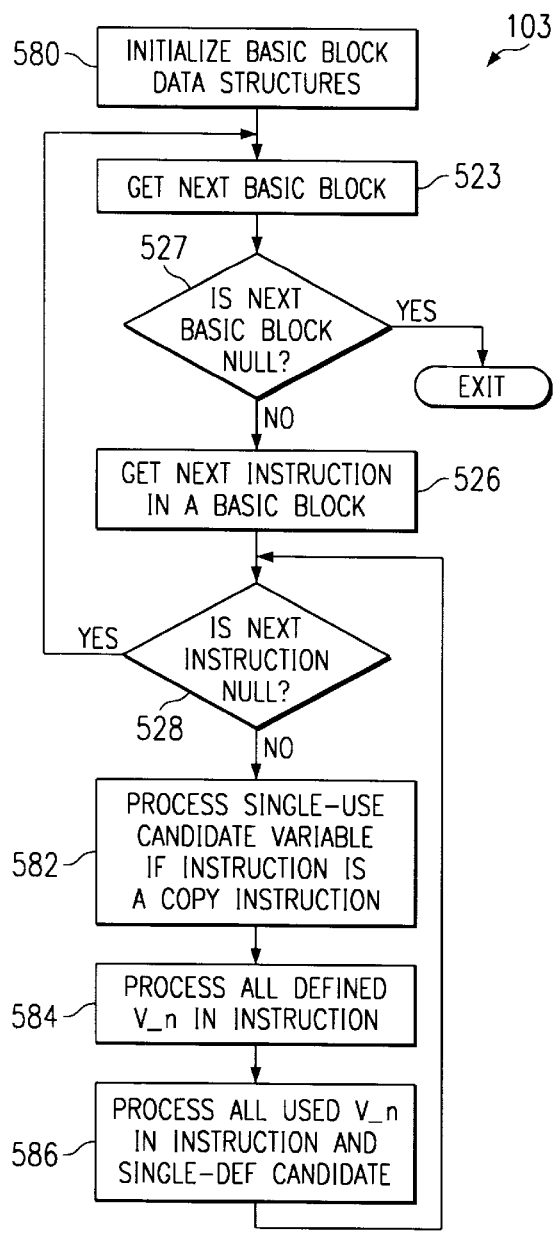
FIG. 5 is a flow diagram of the method of the present invention.

FIG. 5 is a high-level illustration of the processing method of the present invention and FIGS. 5B, 5C, 5D, and 5E are detailed illustrations of the processing method of the present invention. The fast coalescing tool 103 successively analyzes each source code 100 or intermediate code 104 (as shown in FIG. 1) instruction. As shown in FIG. 5, in step 580 the present invention initializes the basic block data structures of the fast coalescing tool 103, thereby configuring the execution environment for the fast coalescing tool 103. Step 580 is illustrated in more detail in FIG. 5B which is discussed below. The present invention, as shown in step 523, processes the user code one basic block at a time. When the fast coalescing tool initiates processing of a basic block, as shown in step 527 it determines whether the basic block is null. This is a loop test technique used by the fast coalescing tool 103 to determine when all the basic blocks in a user program have been processed. When the fast coalescing tool 103 finds that the basic block is null, the fast coalescing tool 103 exits the user processing environment and returns processing control to the computer system 200 (as shown in FIG. 2). While the fast coalescing tool 103 encounters new, non-null basic blocks, it continues to process each basic block as shown in step 526, one instruction at a time. In step 528, the fast coalescing tool 103 uses a null test technique similar to the test used in step 527. By testing in step 528 whether the next instruction is null, the fast coalescing tool 103 determines when processing of the basic block is complete and therefore processing control should be passed back to step 523 to begin processing a new basic block.

While the basic block is being processed, as shown in step 582 in FIG. 5, each instruction is analyzed to determine if the source of a copy instruction is a single-use candidate variable. Single-use variables are candidates for fast coalescing with the target of the single-use instruction. In order to identify the single-use candidate variable in the instruction, the fast coalescing tool 103 determines whether the variable has a single use, whether the single use occurs in a copy instruction, and whether the number_remaining_defs variable corresponding to the single-use candidate variable equals zero. When the fast coalescing tool 103 processes a single-use candidate in step 582 it may coalesce the source with the target of the single-use instruction. Step 582 is illustrated in more detail in FIG. 5C to which is discussed below.

In one configuration of the present invention, when step 582 is completed the fast coalescing tool 103 may continue to process all variables in the instruction as illustrated in step 584. The fast coalescing tool 103 in step 584 may update the interference set of all the variables in the instruction if the variables interfere with the variables in a single-use set or the single-def set; and may further update the bookkeeping values of the number_remaining_defs variable and the number_remaining_uses variable of the processed variables of the instruction. Step 584 is illustrated in more detail in FIG. 5D and is described below.

After the completion of step 584 the present invention may process all the single-def candidate variables, as shown in step 586. In order to identify the single-def candidate variable in the instruction, the fast coalescing tool 103 determines whether the variable has a single definition in the program, whether the single definition occurs in a copy instruction, and whether the number_remaining_uses variable corresponding to the single-def candidate variable equals zero. If the single-def candidate variable may be coalesced, the fast coalescing tool 103 merges the single-def candidate variable and the source of the instruction that defined the single-def candidate variable. Step 586 is illustrated in detail in FIGS. 5D and 5E and is described below.

Figure 5A:
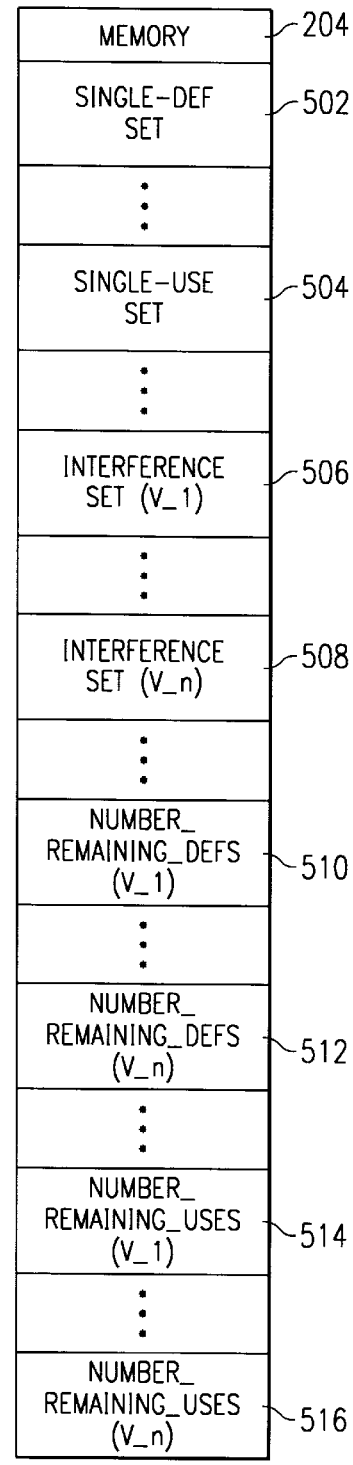
FIG. 5A is a block diagram illustrating the memory created and used by the present invention.

In one configuration of the present invention, the fast coalescing tool 103 (as shown in FIG. 5) communicates with the O.S. 101 (as shown in FIG. 2) using data structures managed by the compiler system, and indicates when processing of the user process is complete and transfers processing control back to the O.S. 101. The structure of the memory 204 is shown in FIG. 5A for illustrative purposes and is referenced in FIGS. 5B, 5C, 5D, and 5E. The single-use set 504 is a data structure of all the variables with a single use in the user program and the single-def set 502 is a data structure of all the variables with a single definition. The fast coalescing tool 103 maintains an interference set for each variable. Recall that an interference set is a log of all the variables that interfere with the variable and may be computed by traversing the instructions in a basic block. The interference set of each variable is herein referenced by (V__n) where "n" refers to an identifier for each unique variable. Therefore, the memory configuration for the interference sets may be represented as a set of memory locations in consecutive numbered order and, interference set (V__1) 506 may begin the consecutive interference sets and interference set (V__n) 508 may represent any particular variable interference set. It will be understood that the interference sets for the variables in the user program may be represented in other forms and the consecutive representation used herein is for illustrative purposes.

Each variable may have a corresponding number__remaining__defs variable and a number__remaining__uses variable. The number__remaining__uses variable maintains a count of the number of uses of the variable that remain in the instructions which have not yet been processed by the fast coalescing tool 103. The number__remaining__defs variable maintains a count of the number of definitions of the variable that remain in the instructions which have not yet been processed by the fast coalescing tool 103. The number__remaining__defs variable is initialized to the total number of definitions of the variable and the number__remaining__uses variable is initialized to the total number of uses of the variable. The data structures in the memory 204 for the number of number__remaining__uses variable and the number__remaining__defs variable are illustrated by consecutive representation and it will be understood that the number of number__remaining__uses variable and the number__remaining__defs variable for the variables in the user program may be represented in other forms. Therefore the number of number__remaining__defs (V__1) 510 may be the first number of remaining defs, and any particular variable may be associated herein with the number__remaining__defs (V__n) 512. Further, the number__remaining__uses (V__1) 514 may be the first number of remaining uses, and any particular variable may be associated herein with the number__remaining__uses (V__n) 516.

Figure 5B:
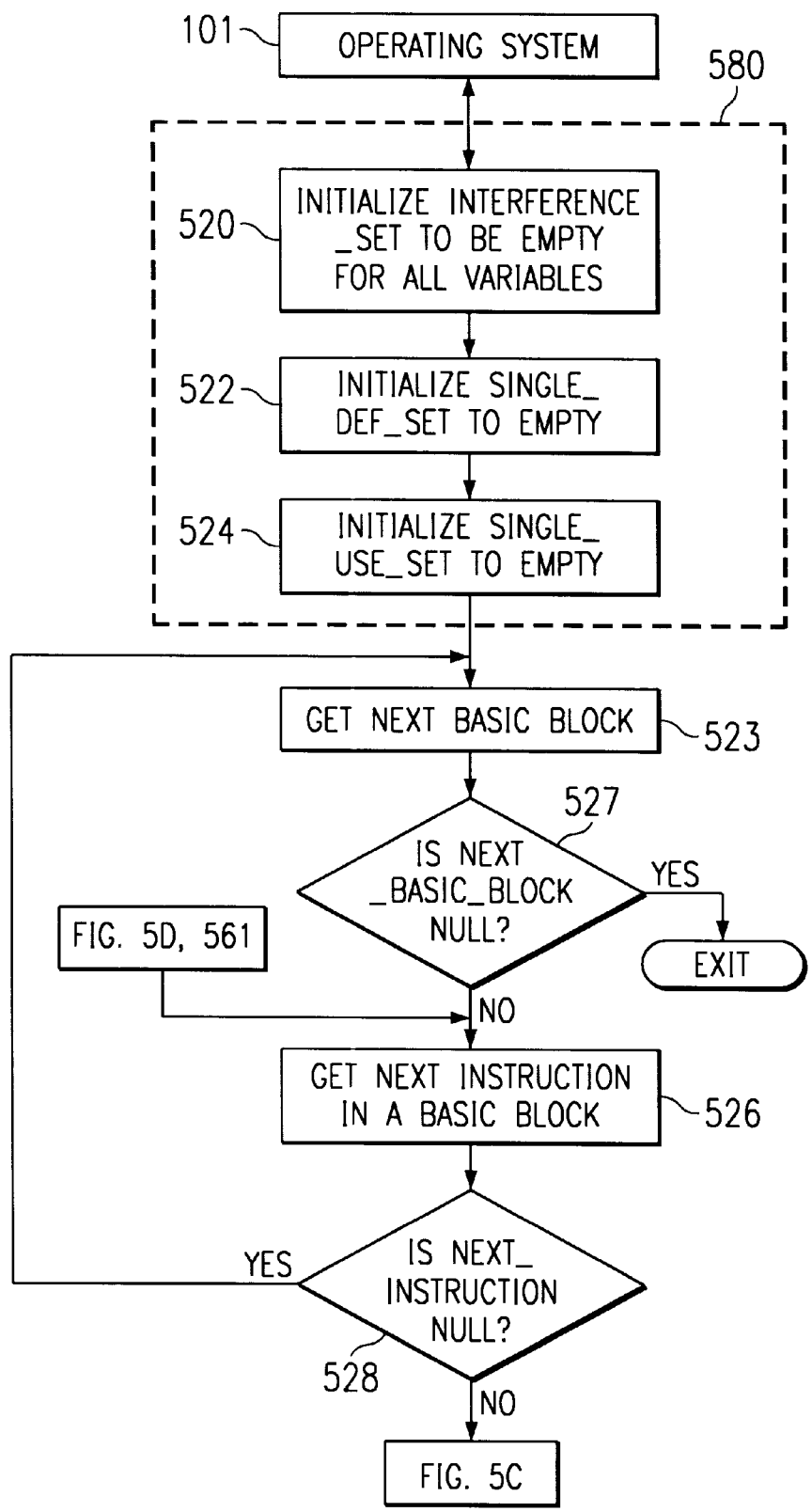

As illustrated in FIG. 5B, in step 520, the present invention initializes the interference set 508 to be empty for all user code variables. In step 522 the fast coalescing tool 103 (as shown in FIG. 5) also initializes the single-def set 502 to be empty, and in step 524 the fast coalescing tool 103 initializes the single-use set to be empty. These initialization steps are employed by the present invention to configure the execution environment for the fast coalescing tool 103. It will be understood that this bookkeeping computation may be achieved in a number of alternative ways and is not limited to the embodiment herein described.

In one embodiment, the present invention processes each basic block, as shown in step 523. The present invention determines whether the next basic block is null in step 527 thereby assessing whether to exit the user process or continue processing the next basic block. When the next basic block is not null the present invention then processes each instruction in the basic block, as shown in step 526. If the next instruction is null, as shown in step 528, the present invention may transfer to step 523 to process the next basic block.

Figure 5C:
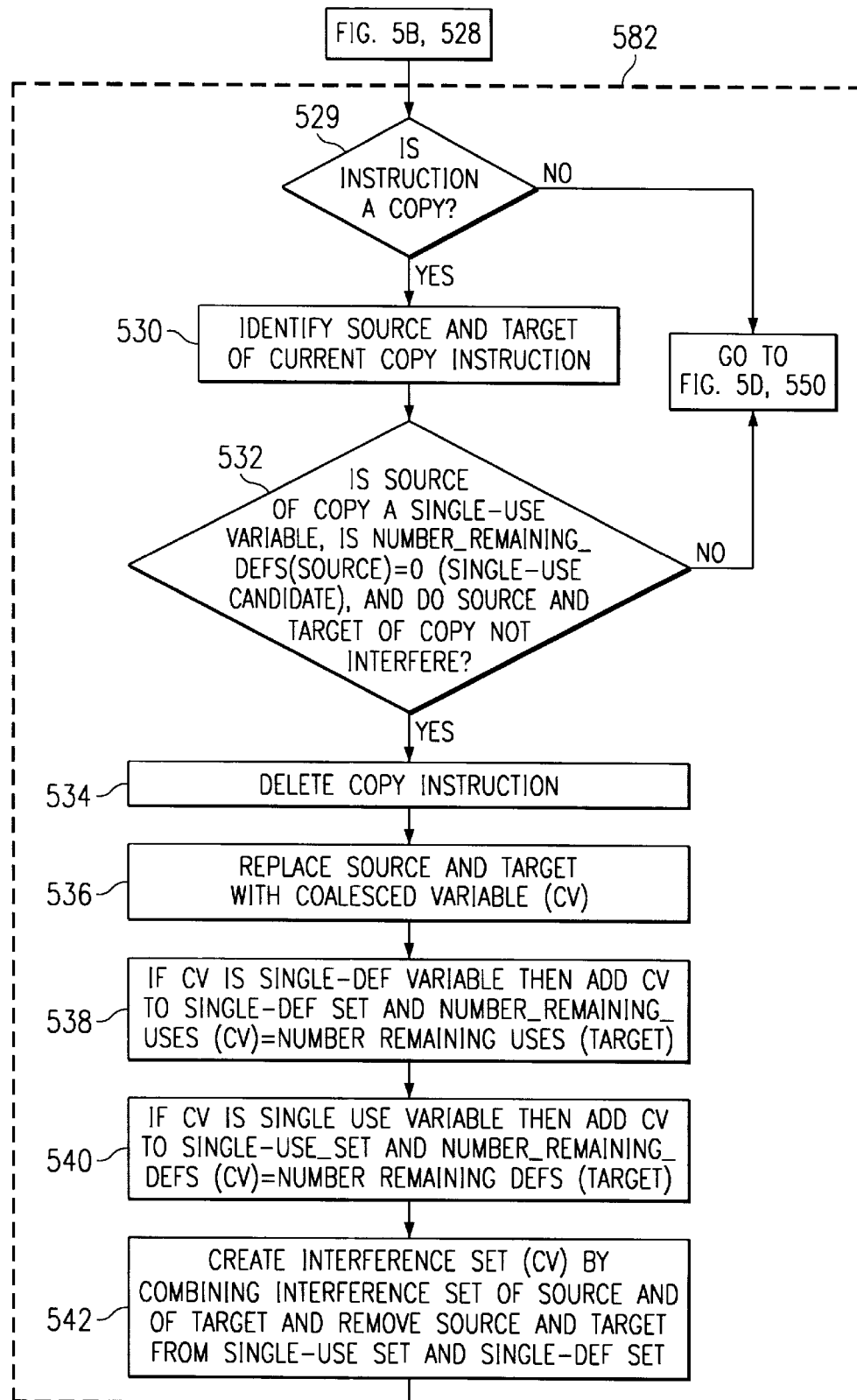

If the next instruction is not null, as determined in step 528 the present invention may begin processing the single use candidates, as illustrated in FIG. 5C and as shown in step 582. The fast coalescing tool advantageously recognizes that optimizing fast coalescing may be applied to copy instructions. Therefore, in step 529, the present invention determines if the instruction is a copy instruction. If the instruction is not a copy instruction, the present invention transfers control to step 550 (as shown in FIG. 5D) for processing of all variables in the instruction. When the instruction is a copy instruction the present invention, in step 530 identifies the source and the target of the copy instruction for further processing and passes processing control to step 532, to determine if the source of the copy instruction is a single-use candidate and whether the source and target of the copy interfere. Recall that a single-use candidate variable is a variable with only one use in the user program and the definitions of the single-use candidate variable in the program occur before the copy instruction containing the single-use candidate variable and in the basic block of the copy instruction, therefore the number__remaining__defs corresponding to the single-use candidate variable equals zero. If the source and target interfere or if the source is not a single-use candidate variable then the processing control is passed to step 550 for processing of all variables in the instruction. On the other hand if the test of step 532 is passed, the source and target of the copy instruction may be coalesced. Therefore, in one configuration of the present invention, in step 534 the copy instruction is deleted and in step 536 the source and target of the copy instruction are merged to form a coalesced variable, herein referred to as "CV". It will be understood that CV could be a different variable from the source variable and the target variable, or CV could represent the re-use of the source variable or the target variable. Steps 534 and 536 represent the coalescing of the source and target of the copy instruction. The present invention completes the coalescing bookkeeping for the source, the target, and CV in steps 538, 540, and 542. Recall that the number__remaining__defs variable 512 of the variable is initialized to the total number of definitions of the variable and the number__remaining__uses variable 516 of the variable is initialized to the total number of uses of the variable. Therefore, since the fast coalescing tool has determined that the source was a single-use variable, if CV is a single-def variable, as shown in step 538 the number of the remaining uses of CV is initialized to the number of remaining uses of the target; and if CV is a single-use variable then as shown in step 540 the number of remaining definitions of CV is initialized to the number of remaining defs of the target. Also, if CV is a single-def variable CV is added to the single-def set 502, as shown in step 538. If CV is a single-use variable, then CV is added to the single-use set, as shown in step 540. The fast coalescing tool 103 completes bookkeeping on the new CV by creating an interference set 508 for CV, as shown in step 542. The interference set for CV is created by combining the interference set of the source and the target. Also, as shown in step 542, the source and the target are removed from the single-use set 504 and the single-def set 502 to complete the bookkeeping.

After processing the single-use candidate variables in the instruction, the present invention processes each variable in the instruction, herein referred to as "V__n", as illustrated in step 584 in FIG. 5D. More particularly, in step 550 the present invention processes each variable, V__n in the instruction and in step 551 determines whether V__n is null. When V__n is null in one configuration of the present invention processing will be passed to step 558 to determine if V__n is a single-def candidate. Alternatively as shown in step 554, when V__n is not null the fast coalescing tool 103

(as shown in FIG. 5) adds V_n to the interference set 508 of all the variables in the single-use set 504 and in the single-def set 502. As shown in step 556, the present invention then determines whether V_n is in the single-use set 504. If V_n is in the single-use set 504 since we already know that V_n is defined in the instruction, the present invention as shown in step 557 decrements by one the number_remaining_defs variable corresponding to V_n 512. Further, since we already know that V_n is defined in the instruction and as shown in step 559, if V_n is not in the single-use set 504 and if V_n is a single-def variable the present invention adds V_n to the single-def set 502 and initializes the number_remaining_uses variable corresponding to V_n 516 to the total number of uses of V_n. Also, as shown in step 559, if V_n is not in the single-use set 504 and if V_n is a single-use variable the present invention adds V_n to the single-use set 504 and initializes the number_remaining_defs variable corresponding to V_n 512 to the total number of definitions of (V_n) minus one.

Figure 5E:
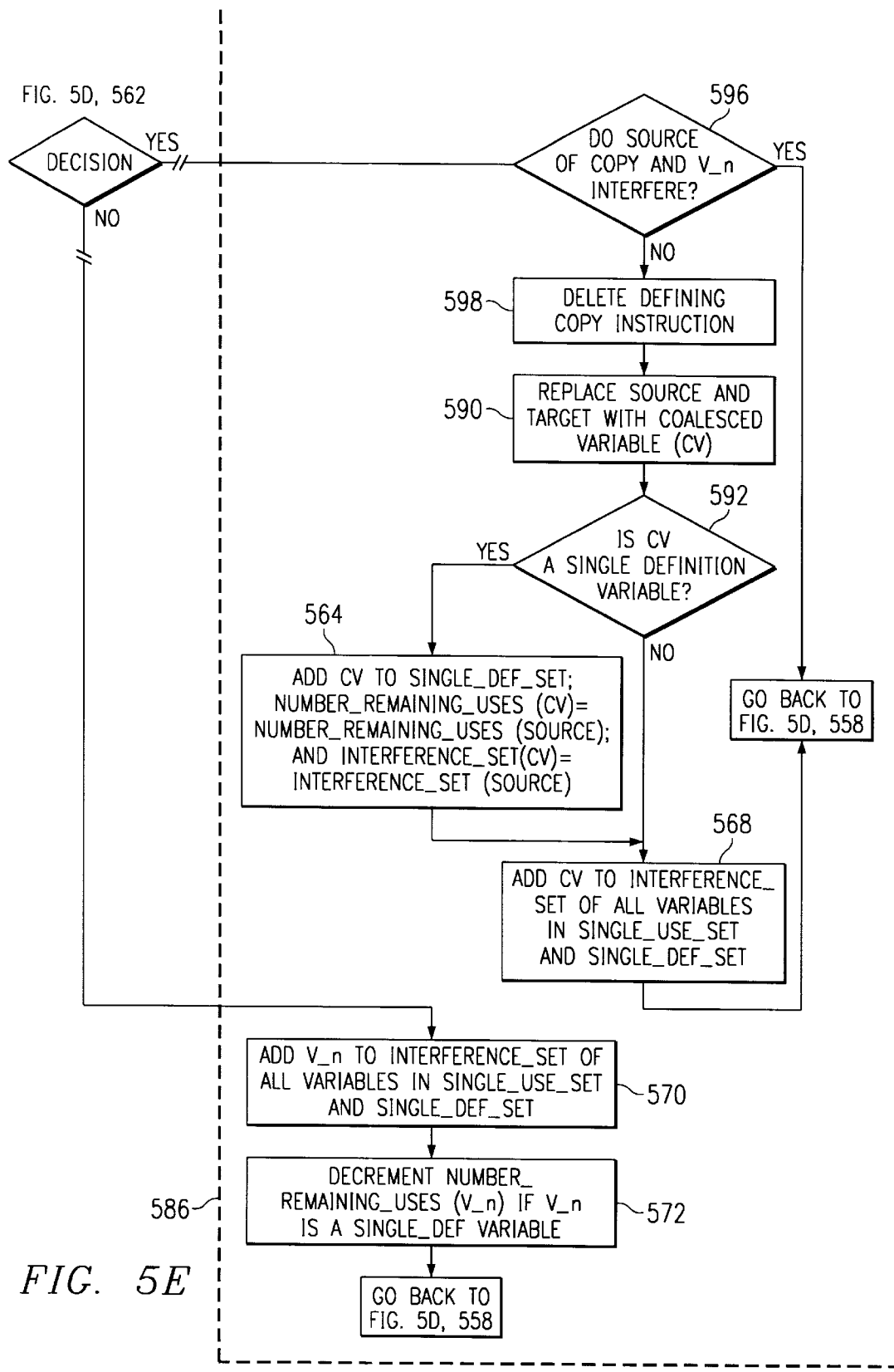

After all the variables in the instruction have been processed the fast coalescing tool 103 completes the instruction processing by analyzing all the used variables in the instruction to determine if any are single-def candidates. The present invention again uses the well known looping technique as shown in steps 558 and 561. First each variable in the instruction, herein referred to as V_n, is processed in step 558. In step 561, if V_n is null, the present invention loops back to step 526 (as shown in FIG. 5) to process another instruction in the basic block. If V_n is not null the present invention moves from step 561 to step 562 to determine if V_n is a single-def candidate variable and if the instruction that defined V_n is a copy instruction. Recall that a single-def candidate variable is a variable with only one definition in the user program and the uses of the single-def candidate variable in the program occur after the defining instruction containing the single-def candidate variable and in the basic block of the defining instruction, therefore the number_remaining_uses corresponding to the single-def candidate variable equals zero. If the present invention determines that V_n is not a single-def candidate processing jumps to step 570 as illustrated in FIG. 5E to complete bookkeeping of V_n. The bookkeeping of V_n includes adding V_n to the interference set 508 of all the variables in the single-use set 504 and in the single-def set 502 as shown in step 570. Further, if V_n is a single-def variable, the number_remaining_uses variable 516 corresponding to V_n is decremented by one, as shown in step 572. After this bookkeeping of V_n is completed in step 572 the present invention loops back to step 558 (as shown in FIG. 5D) to continue processing each variable in the instruction.

Alternatively as further shown in FIG. 5E, if the test of step 562 (as shown in FIG. 5D) is met, the present invention processes step 596 to determine if the source of the copy instruction and V_n interfere, and if they interfere the present invention loops back to step 558 to continue processing each variable in the instruction. If the source of the copy instruction and V_n do not interfere processing is passed to step 598 to delete the defining copy instruction and on to step 590 to replace the source and target of the defining copy instruction with a coalesced variable, herein referred to as "CV". The present intention then determines whether CV is a single-def variable in step 592 and if so; the present invention as shown in step 564 adds CV to the single-def set 502, assigns the number_remaining_uses variable corresponding to CV 516 with the value in the number_remaining_uses variable corresponding to the source 516, and assigns the interference set of CV 508 with the value in the interference set of the source 508. The present invention will pass processing on to step 566 either from step 592 or from 564.

The fast coalescing tool 103 completes bookkeeping by removing the source and target of the defining copy instruction from the single-use set 504 and from the single-def set 502, as shown in step 566. Processing is then passed on to step 568 thereby adding CV to the interference set 508 of all the variables in the single-use set 504 and in the single-def set 502 and the present invention then loops back to step 558 to continue processing each variable in the instruction.

Figure 6:
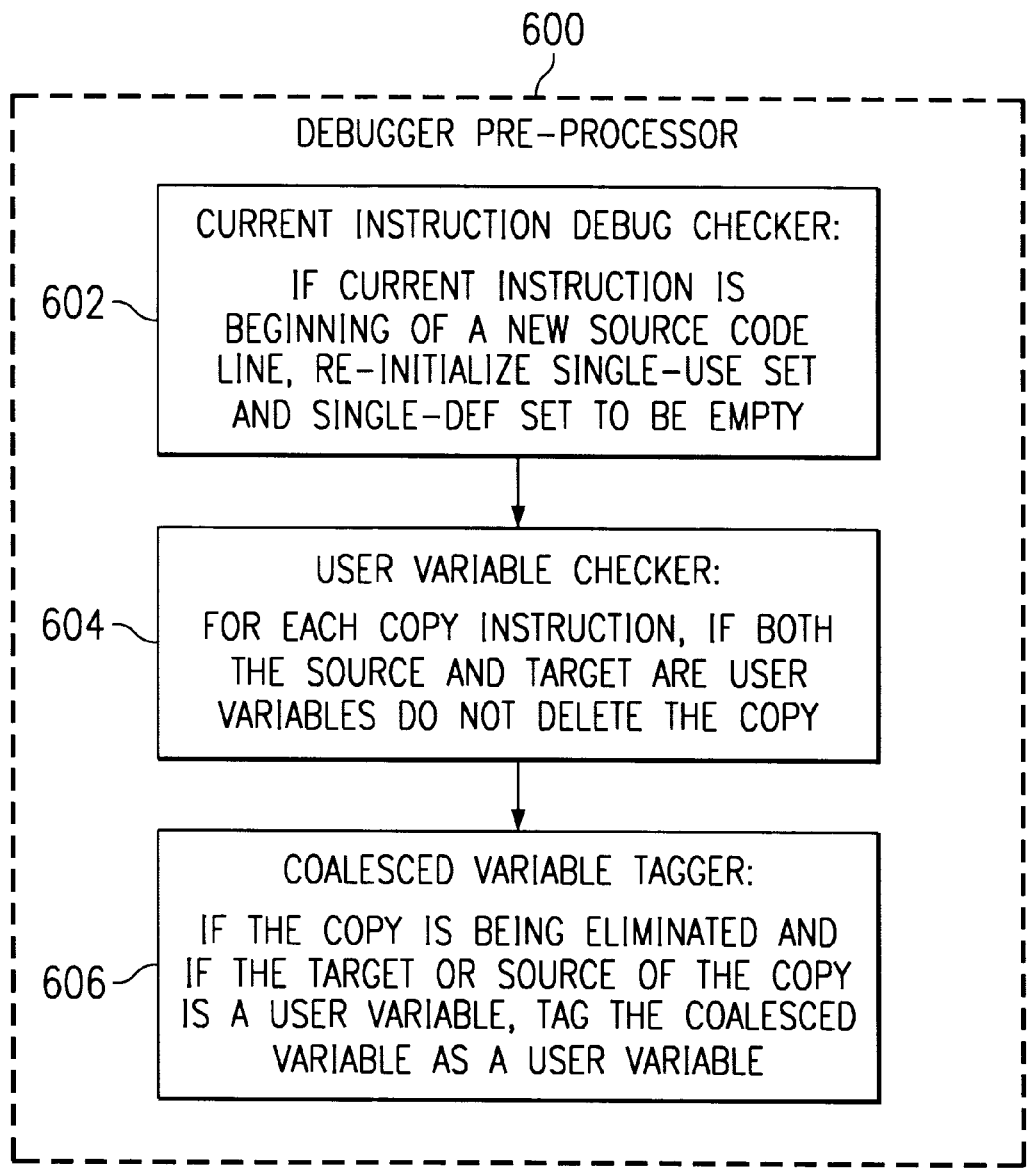
FIG. 6 is a block diagram of the modifications needed to preserve the ability to debug software code.

The present invention may advantageously and optionally process variables and instructions to ensure that user-level debugging is enabled. The fast coalescing tool may enable debugging by maintaining the original relationship between a value and the related variable and by preserving the flow of control of the source code. The present invention may introduce debugging checkpoints whenever a copy instruction may be deleted (as shown in step 534 in FIG. 5C and in step 598 in FIG. 5E). When debugging is enabled, as shown in FIG. 6 the debugger pre-processor 600 may be initiated at the debugging checkpoints. According to the present invention, the debugger pre-processor 600 may initiate processing of the current instruction debug checker 602. The current instruction debug checker 602 will re-initialized the single-use set 504 and the single-def set 502 to be empty when the current instruction is the beginning of a new source code line, thereby ensuring that copy instructions that cross source line boundaries are not eliminated thus maintaining the user-created flow of control of the source code. The current instruction debug checker 602 will transfer processing to the user variable checker 604. The user variable checker 604 determines if both the source and target of a copy instruction, that is scheduled to be deleted by the fast coalescing tool 103 (as shown in FIG. 5), are user variables and not temporary variables. If the source and the target variables are user variables the user variable checker 604 will block the fast coalescing tool 103 from deleting the copy instruction. This ensures that variables which may be modified by the software developer and are visible in the user source code, are not coalesced when debugging is enabled. The user variable checker 604 transfers processing to the coalesced variable tagger 606. The coalesced variable tagger 606 determines when the source or the target of a copy instruction that is scheduled to be deleted is a user variable. If the source or the target is a user variable then the coalesced variable tagger 607 tags the coalesced variable as a user variable. This further enables debugging by maintaining the user-visible properties of the source or the target that was a user variable in the coalesced variable, thereby preserving the accessibility of the variable and its properties to the user.

While a problem with prior optimization tools is that register allocation requires extensive processing, the present invention advantageously operates in one compiler pass by recognizing that fast coalescing is possible when the variables' definitions and uses are within the same basic block of code. By operating within one compiler pass, the present invention advantageously produces coalesced code that preserves the order of the original instructions and the values of the original variables and thereby enables the processing of user-level debugging tools on fast coalesced code.

The present invention is a software development tool for optimization that analyzes an instruction, and the instruction's source variable and target variable for opportunities to coalesce the source variable and the target variable. The present invention includes a single-use_candidate processor that coalesces a target variable of a copy instruction and a source variable of the copy instruction; when the target variable of a copy instruction does not interfere with the source variable of the copy instruction, and the only use of the source variable is in the copy instruction, and the source variable has one or more definitions in the program and all the definitions precede the copy instruction and are within the same block. The present invention employs a "variable_ defined_in_instruction processor" that updates the interference set of all the variables in the instruction and the number_remaining_defs variable and the number_ remaining_uses variable corresponding to the processed variables of the instruction. The present invention further uses a "variable_used_in_instruction_and_single-def_ candidate processor" to determine if a variable has a single definition and may be coalesced. The "variable_used_in_ instruction_and_single-def_candidate processor" coalesces a source variable of a copy instruction with a target variable of the copy instruction when; the target variable has a single definition that is defined in the copy instruction, and the definition of the target variable precedes all uses of the variable in the program, and all uses of the variable are in the same basic block as the copy instruction, and the source of the copy instruction and the target of the copy instruction do not interfere. The present invention tailors its processing to advantageously enable user-level debugging when debugging is required.

Although a specific embodiment of the invention has been described and illustrated, the invention is not to be limited to the specific forms or arrangement of parts so described and illustrated. Those skilled in the art will recognize that changes may be made in form and detail without departing from the spirit and scope of the invention.

What is claimed is:

1. A computer implemented method for forming a coalesced variable in software code having instructions that execute on the computer, the instructions being arranged into one or more blocks of instructions, with the instructions in each block arranged in a programmed order, wherein the software code comprises a copy instruction, a first variable that is a source of the copy instruction, and a second variable that is a target of the copy instruction, which comprises;
    a. recognizing non-interference when the first variable does not interfere with the second variable, exclusive of the copy instruction;
    b. recognizing single-use of the first variable when the first variable is used only once in the software code;
    c. recognizing precedence when definitions of the first variable are all in a common block with the copy instruction and precede the copy instruction in the programmed order; and
    d. eliminating the copy instruction before the copy instruction executes on the computer when precedence, single-use, and non-interference are recognized thereby reducing the instructions that execute on the computer and optimizing execution of the instructions on the computer.

2. A computer implemented method for forming a coalesced variable as set forth in claim 1, further including, recognizing that either the first variable or the second variable is a user variable and maintaining correspondence between the user variable and the coalesced variable and preserving the pre-coalesced programmed order of the software code instructions thereby optimizing execution of the instructions on the computer while enabling debugging of the instructions.

3. A computer implemented method for forming a coalesced variable in software code having instructions that execute on the computer, the instructions being arranged into one or more blocks of instructions, with the instructions in each block arranged in a programmed order, wherein the software code comprises a copy instruction, a first variable that is a source of the copy instruction, and a second variable that is a target of the copy instruction, which comprises;
    a. recognizing non-interference when the second variable does not interfere with the first variable, exclusive of the copy instruction;
    b. recognizing single-def of the second variable when the second variable is defined only once in the software code;
    c. recognizing succession when uses of the second variable are all in a common block with the copy instruction and succeed the copy instruction in the programmed order;
    d. eliminating the copy instruction before the copy instruction executes on the computer thereby reducing the instructions that execute on the computer, and coalescing the second variable and the first variable into the coalesced variable when succession, single-def, and non-interference are recognized thereby optimizing execution of the instructions on the computer; and
    e. replacing subsequent definitions of the first variable with the coalesced variable thereby coalescing the first variable and optimizing execution of the instructions in the computer.

4. A computer implemented method for forming a coalesced variable as set forth in claim 3, further including, recognizing that either the first variable or the second variable is a user variable and maintaining correspondence between the user variable and the coalesced variable and preserving the pre-coalesced programmed order of the software code instructions thereby optimizing execution of the instructions on the computer while enabling debugging of the instructions.

5. A computer implemented method for forming a coalesced variable in software code having instructions that execute on the computer, the instructions being arranged into a block of instructions, with the instructions in the block arranged in a programmed order, wherein the software code comprises a copy instruction, and a set of variables wherein, the set of variables includes a first variable that is a source of the copy instruction and a second variable that is a target of the copy instruction; which comprises;
    a. initializing an interference set associated with each variable of the set of variables to an empty entry when the software code is executing on the computer;
    b. initializing a single-def set to an empty entry when the software code is executing on the computer;
    c. initializing a single-use set to an empty entry when the software code is executing on the computer;
    d. wherein, for each instruction in the block, when the instruction is the copy instruction,
        i. analyzing the interference set for the first variable and the interference set for the second variable to determine if the first variable and the second variable interfere; and
        ii. eliminating the copy instruction before the instruction executes on the computer by,
            (1) recognizing non-interference when the first variable and the second variable do not interfere;

(2) recognizing single-use of the first variable when the first variable is used only once in the software code;

(3) recognizing precedence when definitions of the first variable are in a common block with the copy instruction and precede the use of the copy instruction in the programmed order; and (4) deleting the copy instruction when non-interference, single-use, and precedence are recognized thereby reducing the instructions that execute on the computer and optimizing execution of the instructions on the computer; and e. wherein for each instruction in the block and for each variable in the each instruction;

i. determining if the variable in the instruction interferes with one or more variables that are members of the single-use set;

ii. determining if the variable in the instruction interferes with one or more variables that are members of the single-def set;

iii. adding the variable in the instruction to the members of the interference set of the variable that is the member of the single-use set, if the variable in the instruction and the variable that is the member of the single-use set interfere;

iv. adding the variable in the instruction to the members of the interference set of the variable that is the member of the single-def set, if the variable in the instruction and the variable that is the member of the single-def set interfere; and v. coalescing the variable of the instruction that is the member of the single-def set, and that is also the second variable, with the first variable into the coalesced variable, replacing subsequent uses of the second variable in the programmed order with the coalesced variable; and eliminating the copy instruction before the instruction executes on the computer by, (1) recognizing non-interference when the first variable and the second variable do not interfere;

(2) recognizing single-def of the second variable when the second variable is defined only once in the software code;

(3) recognizing succession when the second variable is defined in the copy instruction and uses of the second variable are in a common block with the copy instruction and succeed the copy instruction in the programmed order; and (4) deleting the copy instruction when non-interference, single-def, and succession are recognized thereby reducing the instructions that execute on the computer and optimizing execution of the instructions on the computer.

6. A computer implemented method as set forth in claim 5, the software code further comprising a user source code line and one or more user variables, the method further comprising;

a. re-initializing the single-use set and the single-def set to an empty entry if the instruction begins the user source code line;

b. wherein coalescing the first variable and the second variable further comprises refraining from deleting the copy instruction if the first variable and the second variable are the user variables; and c. tagging the coalesced variable as the user variable if the first variable or the second variable is the user variable thereby enabling debugging by maintaining the user variable.

7. A computer system coalescing tool for forming a coalesced variable, wherein the computer system includes software code having instructions arranged into one or more blocks of instructions that execute on the computer with the instructions in each block arranged in a programmed order, the software code comprising a set of variables, the instruction having one or more variables that are members of the set of variables, a copy instruction, a first variable that is a source of the copy instruction, and a second variable that is a target of the copy instruction, comprising;

a. an interference set that includes the variables that are used during execution on the computer and the interference set is capable of storing entries that represent interference between the variables;

b. a single-use set that includes the variables that are used during execution on the computer and the single-use set is capable of storing entries that represent variables that have a single use in the software code;

c. a single-def set that includes the variables that are used during execution on the computer and the single-def set is capable of storing entries that represent variables that have a single definition in the software code;

d. a processor for executing the instruction on the computer system;

e. an initializer that assigns an empty entry to the interference set of the variable in the instruction, that assigns empty to the single-use set, and that assigns empty to the single-def set;

f. a single-use__candidate processor that analyzes the interference set for the first variable and the interference set for the second variable to determine if the first variable and the second variable interfere; and deletes the copy instruction, when;

i. the first variable is used only once in the software code; and ii. the first variable and the second variable do not interfere; and iii. definitions of the first variable are in a common block with the copy instruction and precede the use of the first variable in the programmed order;

g. a variable__defined__in__instruction processor that for each variable in the instruction;

i. analyzes the interference set for the variables in the instruction;

ii. analyzes the interference set for the variables that are members of the single-use set to determine if the variable in the instruction interferes with any variables that are members of the single-use set, iii. adds the variable in the instruction to the interference set of the variables that are members of the single-use set if the variable in the instruction and the variables that are members of the single-use set interfere;

iv. analyzes the interference set for the variables that are members of the single-def set to determine if the variable in the instruction interferes with any variables that are members of the single-def set; and v. adds the variable in the instruction to the interference set of the variables that are members of the single-def set if the variable in the instruction and the variables that are members of the single-def set interfere; and h. a variable__used__in__instruction__and__single-def__candidate__variable processor that coalesces the variable in the instruction with the first variable into a coalesced variable, that replaces uses of the variable with the coalesced variable, and that deletes the copy instruction before the copy instruction is executed on the computer when;
  i. the variable in the instruction is a member of the single-def set and the variable in the instruction is also the second variable;
  ii. the first variable and the second variable do not interfere;
  iii. the second variable is defined once in the software code instructions;
  iv. the second variable definition is in the copy instruction; and
  v. uses of the second variable are in a common block and succeed the copy instruction in the programmed order thereby reducing the instructions that execute on the computer and optimizing execution of the instructions on the computer.

8. A computer system coalescing tool as set forth in claim 7, the software code further comprising a user source code line and user variables, the computer system further comprising;
  a. a current instruction debug checker that re-initializes the single-use set and the single-def set to an empty entry if the instruction begins the user source code line;
  b. a user variable checker wherein if the first variable and the second variable are the user variables;
    i. directs the variable__used__in__instruction__and__single-def__candidate__variable processor to refrain from deleting the copy instruction; and
    ii. directs the single-use__candidate processor to refrain from deleting the copy instruction; and
  c. a coalesced variable tagger that tags the coalesced variable as the user variable if the first variable or the second variable of the deleted copy instruction is the user variable thereby enabling debugging by maintaining the user variable.

9. An article of manufacture comprising a computer product for use by an interference recognizing, single-use recognizing, and precedence recognizing coalescing tool, the article having software code arranged into one or more blocks of instructions that execute on the computer, with the instructions in each block arranged in a programmed order; further comprising a program storage medium, wherein;
  a. computer readable program code identifies a first variable that is a source of a copy instruction and a second variable that is a target of the copy instruction;
  b. computer readable program code recognizes non-interference when the first variable does not interfere with the second variable, exclusive of the copy instruction;
  c. computer readable program code recognizes single-use when the use of the first variable is the only use of the first variable in the software code;
  d. computer readable program code recognizes precedence when definitions of the first variable are all in a common block with the copy instruction and precede the copy instruction in the programmed order; and
  e. computer readable program code eliminates the copy instruction before the copy instruction executes on the computer when precedence, single-use, and non-interference are recognized thereby reducing the instructions that execute on the computer and optimizing execution of the instructions on the computer.

10. An article of manufacture comprising a computer product for use by an interference recognizing, single-def recognizing, and succession recognizing coalescing tool, the article having software code arranged into one or more blocks of instructions that execute on the computer, with the instructions in each block arranged in a programmed order; further comprising a program storage medium, wherein;
  a. computer readable program code identifies a first variable that is a source of a copy instruction and a second variable that is a target of the copy instruction;
  b. computer readable program code recognizes non-interference when the first variable does not interfere with the second variable, exclusive of the copy instruction;
  c. computer readable program code recognizes single-def when definition of the second variable is the only definition of the second variable in the software code;
  d. computer readable program code recognizes succession when uses of the second variable are all in a common block with the copy instruction and succeed the copy instruction in the programmed order; and
  e. computer readable program code eliminates the copy instruction before the copy instruction executes on the computer thereby reducing the instructions that execute on the computer, coalesces the first variable and the second variable into a coalesced variable, and replaces the subsequent uses, in the programmed order, of the second variable with the coalesced variable; when succession, single-def, and non-interference are recognized thereby coalescing the second variable and optimizing execution of the instructions in the computer.

* * * * *